(12) United States Patent
Layzell et al.

(10) Patent No.: US 10,284,620 B2
(45) Date of Patent: May 7, 2019

(54) GRAPHICAL MAPPING OF APPLICATION PROGRAMMING INTERFACE PARAMETERS

(71) Applicant: CA, Inc., New York, NY (US)

(72) Inventors: Robert Layzell, Novato, CA (US); Simon Cockayne, Charlottesville, VA (US); Todd Anderson, Hopkinton, MA (US)

(73) Assignee: CA, Inc., New York, NY (US)

( * ) Notice: Subject to any disclaimer, the term of this patent is extended or adjusted under 35 U.S.C. 154(b) by 603 days.

(21) Appl. No.: 14/670,685

(22) Filed: Mar. 27, 2015

(65) Prior Publication Data

US 2016/0283289 A1    Sep. 29, 2016

(51) Int. Cl.
*H04L 29/08* (2006.01)

(52) U.S. Cl.
CPC ................................. *H04L 67/02* (2013.01)

(58) Field of Classification Search
CPC ....................................................... H04L 67/02
USPC ....................................................... 719/328
See application file for complete search history.

(56) References Cited

U.S. PATENT DOCUMENTS

| | | | | |
|---|---|---|---|---|
| 2010/0049628 A1* | 2/2010 | Mannava | ............... | G06Q 10/10 705/26.1 |
| 2011/0184990 A1* | 7/2011 | Murphy | .................... | G06F 8/20 707/791 |
| 2015/0248276 A1* | 9/2015 | Chan | ......................... | G06F 8/30 719/328 |
| 2016/0054982 A1* | 2/2016 | Itani | ........................ | G06F 8/36 717/105 |

OTHER PUBLICATIONS

Orliesaurus; A review of all most common API editors; 24 pages (enlarged figures at the end); Oct. 24, 2014 (Year: 2014).*
SmartBear SoapUI; Understanding REST Parameters and Working with REST Requests; 15 pages; archived Feb. 9, 2014 (Year: 2014).*

* cited by examiner

*Primary Examiner* — S. Sough
*Assistant Examiner* — Kimberly L Jordan
(74) *Attorney, Agent, or Firm* — Meyertons, Hood, Kivlin, Kowert & Goetzel, P.C.

(57) ABSTRACT

Designing an Application Programming Interface (API) may include parsing a first API definition for an input element, and outputting a user interface (UI) for display to a user. The UI may include a UI control set corresponding to the input element. The UI control set may include a text control for receiving a name for the input element in a second API definition, and a type control for receiving a type for the input element in the second API definition. Designing the API may also include receiving the name and type via the text control and the type control, respectively, and generating the second API definition. The generating may include positioning the received name within a command syntax of the second API definition according to the received type.

19 Claims, 8 Drawing Sheets

GRAPHICAL MAPPING OF APPLICATION PROGRAMMING INTERFACE PARAMETERS

BACKGROUND

The manner in which software accepts input and returns output is often referred to as an Application Programming Interface (API) of that software. An API may be used to invoke the functions of that software, for example, by other programs. The C++ Standard Template Library is an example of an API that permits users to write applications that take advantage of many common functions, e.g., creating linked lists. Other APIs allows users to make use of web services over the Internet. The functions exposed by an API may be remotely invoked through use of a supported messaging protocol. For example, an API may support receiving Extensible Markup Language (XML) formatted Simple Object Application Protocol (SOAP) messages over Hypertext Transfer Protocol (HTTP) or HTTP Secure (HTTPS) in order to provide a web service to Internet users. That same service may also be exposed through a different API that instead uses HTTP(S) to exchange messages in JavaScript Object Notation (JSON) format, for example.

The design of an API may be communicated by an API definition (or description). An API definition may take numerous forms. One form of API definition, for example, is documentation that lists the function prototypes of the API, including the parameters used by each function. Another form of API definition, for example, is a document written in an Interface Definition Language (IDL) (sometimes also referred to as an Interface Description Language). One such IDL is Web Services Description Language (WSDL) (formerly known as Web Services Definition Language). WSDL makes use of the XML format, which is a machine-readable format that may allow a computer to read a WSDL document, and learn the interface of a web service programmatically. As shown above in the context of IDLs and WSDL, the terms "definition" and "description" are often used interchangeably by those of ordinary skill in the art. Accordingly, the terms "definition" and "description" as used throughout the present disclosure should similarly be viewed as interchangeable.

New versions of software may be developed that result in changes to an existing API, or add a new API. For example, a new software version may add new functions, modify the parameters required to invoke old functions, and remove outdated functions. A new software version may also, for example, add an API to expose existing software functions as a web-service, or to shift from one messaging approach to another. The complexity of designing a new API that captures aspects of an existing API can vary greatly, depending on the complexity of the existing API (among other factors).

BRIEF SUMMARY

Embodiments of the present disclosure provide methods, devices, and computer-readable storage mediums for designing an API.

In one embodiment, a method comprises parsing a first API definition for an input element, and outputting a user interface (UI) for display to a user. The UI comprises a UI control set corresponding to the input element. The UI control set comprises a text control for receiving a name for the input element in a second API definition, and a type control for receiving a type for the input element in the second API definition. The method further comprises receiving the name and type via the text control and the type control, respectively, and generating the second API definition. The generating comprises positioning the received name within a command syntax of the second API definition according to the received type.

In another embodiment, a user device comprises processing circuitry that is communicatively coupled to input circuitry and output circuitry. The input circuitry is configured to accept input from a user of the user device. The output circuitry is configured to output signals for display to the user. The processing circuitry is configured to parse a first API definition for an input element, and output a UI, via the output circuitry, for display to a user. The UI comprises a UI control set corresponding to the input element. The UI control set comprises a text control for receiving a name for the input element in a second API definition, and a type control for receiving a type for the input element in the second API definition. The processing circuitry is further configured to receive, via the input circuitry, control signals specifying the name and type via the text control and type control, respectively, and to generate the second API definition. The generating comprises positioning the received name within a command syntax of the second API definition according to the received type.

In another embodiment, a computer readable storage medium comprises computer program code stored thereon that, when executed by a processing circuit of a computing device, configures the processing circuit to parse a first API definition for an input element, and output a UI for display to a user. The UI comprises a UI control set corresponding to the input element. The UI control set comprises a text control for receiving a name for the input element in a second API definition, and a type control for receiving a type for the input element in the second API definition. The computer program code further configures the processing circuit to receive the name and type via the text control and the type control, respectively, and generate the second API definition. The generating comprises positioning the received name within a command syntax of the second API definition according to the received type.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
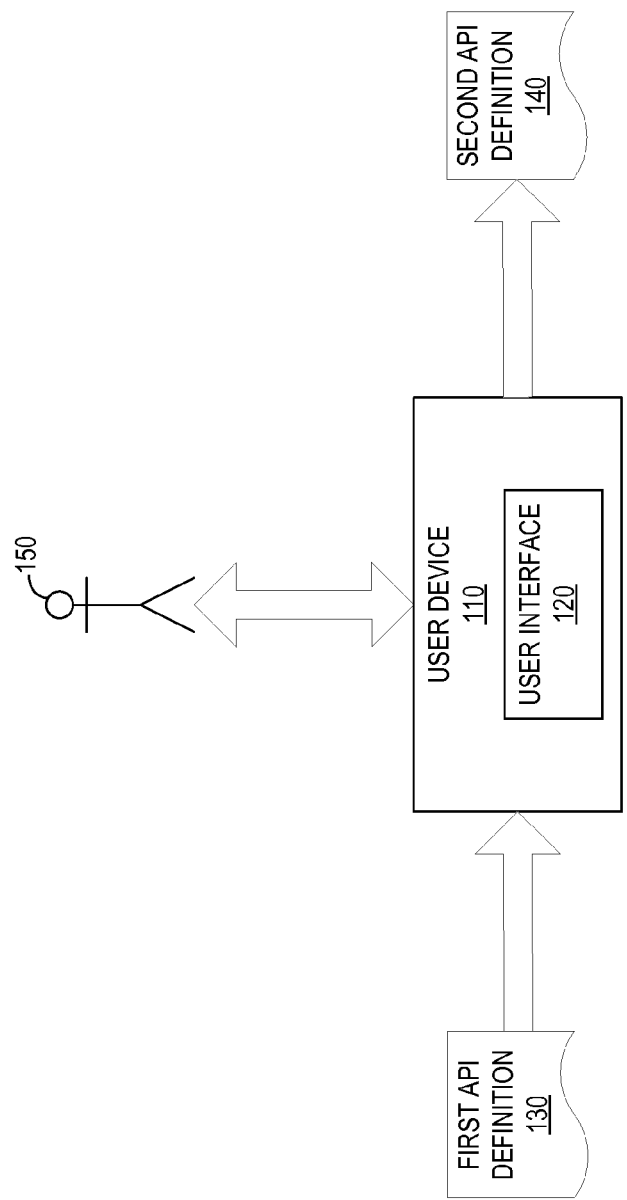
FIG. 1 is a logical diagram illustrating the interaction of a user with a UI of a user device to produce a second API definition from a first API definition, according to embodiments of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, the present disclosure provides a computer-implemented method, a user-device, and a computer readable storage medium comprising corresponding computer program code for graphically mapping the API parameters of a first API to a second API in order to facilitate generation of a second API definition from a first API definition. FIG. 1 illustrates the interaction of a user 150 with a UI 120 of a user device 110 to produce a second API definition 140 from a first API definition 130. According to embodiments, the user device 110 uses the first API definition 130 as the basis for outputting a UI 120 that enables the user 150 to control generation of the second API definition 140.

Figure 2:
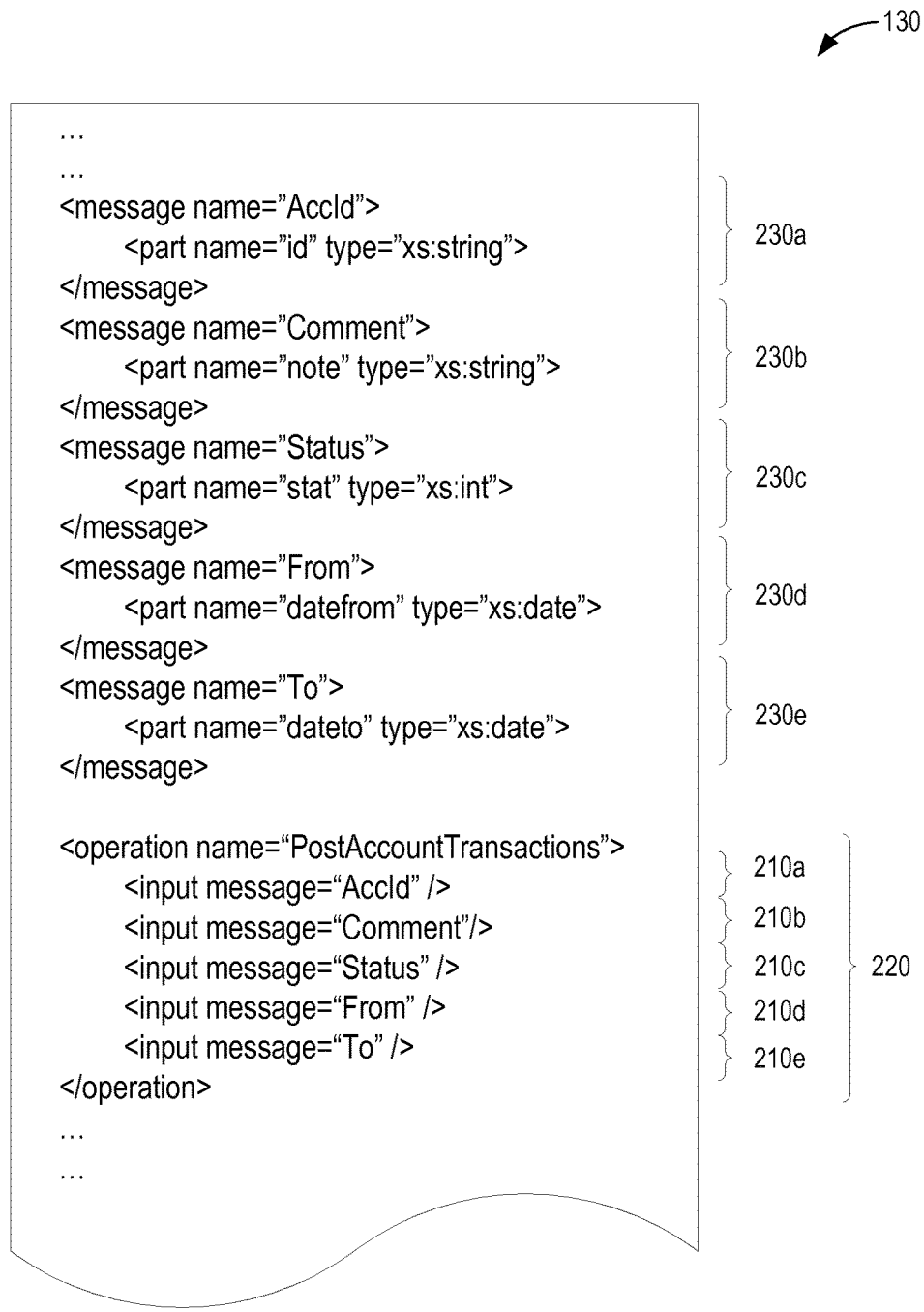
FIG. 2 is a logical diagram illustrating an example of a first API definition, according to embodiments of the present disclosure.

FIG. 2 illustrates an example of the first API definition 130 according to embodiments of the present disclosure. The first API definition 130 uses a machine-readable format and comprises at least one input element 210 to describe a first API. According to embodiments, the first API definition 130 also defines an operation 220 that makes use of one or more of the input elements 210. For example, the first API definition 130 depicted in FIG. 2 is a WSDL document, which is a standard IDL for defining APIs. Other embodiments of the first API definition 130 may be written in a machine-readable format that is non-standard or proprietary. In the embodiment illustrated in FIG. 2, the first API definition 130 describes an operation 220 named "PostAccountTransactions" that makes use of input elements 210a-e (namely, "AccId," "Comment," "Status," "From," and "To," respectively). In WSDL, an input element 210 describing a parameter of an operation 220 can be identified by an <input> XML element, and an operation element can be identified by an <operation> XML element. As shown in FIG. 2, input elements 210a-e are within the operation element 220, thereby indicating that the operation defined by operation element 220 makes use of parameters defined by input elements 210a-e.

Other ways of describing an input element 210, an operation element 220, and a relationship between an input element 210 and operation element 220 depend on the particular embodiment of the first API definition 130. For example, other embodiments of the first API definition 130 may identify an input element and an operation element by using JSON attribute/value pairs that are appropriately juxtaposed according to a particular IDL. The first API definition 130 may also supplement an operation element 220 and/or input element 210 with additional detail via associated elements provided elsewhere in the first API definition 130. For example, the WSDL in FIG. 2 illustrates message elements 230a-e that specify the data type (e.g., string, date, integer) of corresponding input elements 210a-e. The operation element may also have corresponding elements that provide additional information about an operation in a fashion similar to the depicted message elements 230a-e.

Figure 3:
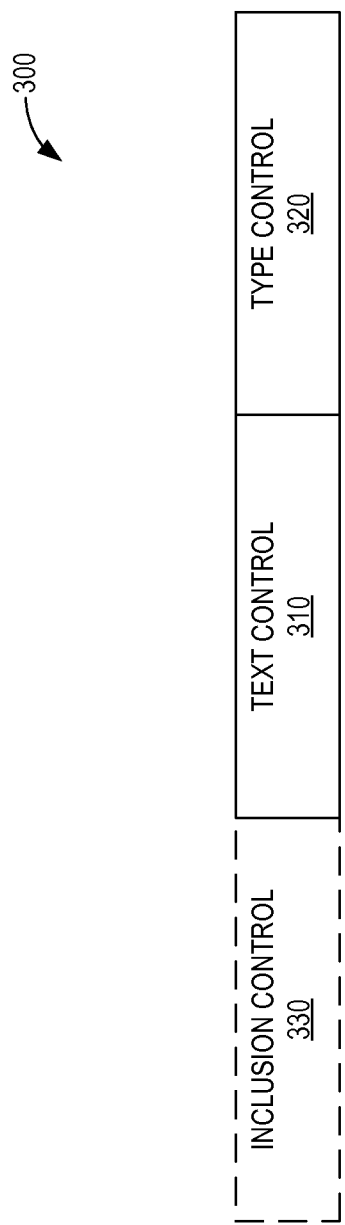
FIG. 3 is a logical diagram illustrating a UI control set, according to embodiments of the present disclosure.

User device 110 parses the first API definition 130 for an input element 210 (e.g., any of input elements 210a-e) and outputs a UI 120 for display to a user 150. The UI 120 comprises a UI control set that corresponds to the input element 210, and is useful, for example, for controlling how the input element 210 located within the first API definition 130 will be represented in the second API definition 140. A logical representation of a UI control set 300, according to embodiments of the present disclosure, is illustrated in FIG. 3. UI control set 300 comprises a text control 310 and a type control 320. The UI control set 300 also optionally comprises an inclusion control 330.

The text control 310 is for receiving a name for the input element 210 (i.e., the input element located in the first API definition 130) in the second API definition 140. For example, the input element 210a has an identifier "AccId" according to the first API definition 130, as depicted in FIG. 2. User 150 may view this identifier as being unsuitable for use in the second API definition 140 (e.g., user 150 may desire a more articulate, detailed, or human-readable name to be used in the second API definition 140). Accordingly, the text control 310 allows the user 150 to provide user input that specifies a name other than "AccId" for the input element 210 in the second API definition 140. Such a text control 310 may be implemented, according to embodiments, using a textbox that allows the user 150 to enter text specifying what the name of the input element 210 in the second API definition 140 will be.

The type control 320 is for receiving a type for the input element 210 in the second API definition 140. As will be explained further below, the user 150 may use the type control 320 to specify how the name is positioned in a command syntax of the second API definition 140. Such a type control 320 may be implemented, according to embodiments, using a pull-down menu containing a list of types, wherein each type corresponds to a different positioning that is valid within the command syntax of the second API definition 140.

The inclusion control 330 is for designating whether the input element 210 is included in the second API definition 140. Such an inclusion control 330 may be implemented, according to embodiments, using a checkbox by which the user may designate that the input element 210 be included in the second API definition 140 by placing a check in the checkbox, and may designate that the input element 210 not be included in the second API definition 140 by clearing the checkbox.

Figure 4:
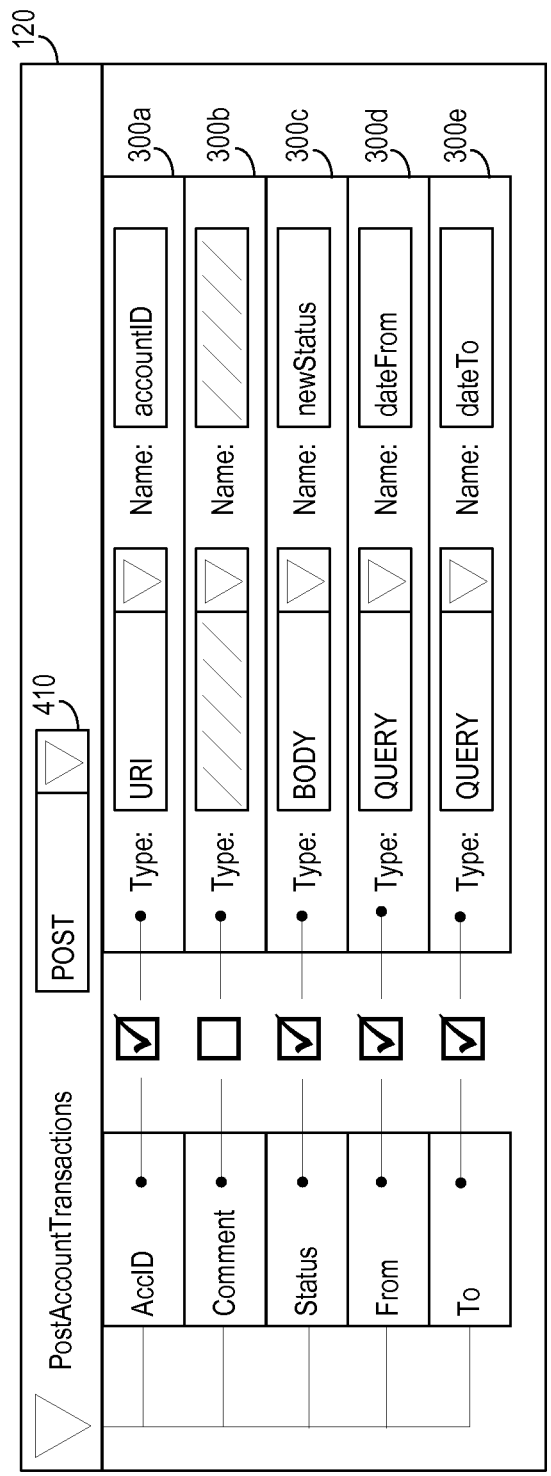
FIG. 4 is a logical diagram illustrating a UI comprising UI control sets, according to embodiments of the present disclosure.

FIG. 4 illustrates an example of a UI 120 according to embodiments of the present disclosure. The UI 120 of FIG. 4 comprises five UI control sets 300a-e, which correspond to the example input elements 210a-e defined in the first API definition 130 depicted in FIG. 2. Each of the control sets 300a-e comprises a text control 310, a type control 320, and an inclusion control 330 (in this example, a textbox, a pull-down menu, and a checkbox, respectively). The UI 120 also visually associates each control set 300 with an identifier of the corresponding input element 210 according to the first API definition 130. In particular, control set 300a is visually associated by a connector to a text label to the identifier of input element 210a in the first API definition 130 (namely, "AccID"). Similarly, control set 300b is visually associated by a connector to a text label to the identifier of input element 210b in the first API definition 130 (namely, "Comment"). Control sets 300c-e are similarly visually associated with the respective identifiers of input elements 210c-e.

A user 150 has used UI 120, as depicted in FIG. 4, to specify names for the input elements 210a, 210c-e in the second API definition 140. In particular, the user 150 has specified the name "accountID" for input element 210a in the second API definition 140. Similarly, the user 150 has specified the name "newStatus" for input element 210c, "dateFrom" for input element 210d, and "dateTo" for input element 210e. Thus, the user 150 is able to override the identifiers of the respective input elements 210. Such may be useful, for example, if the identifiers for input elements 210 in the first API definition 130 are overly terse (e.g., "x1," "x2," "x3"), deliberately obfuscated (e.g., to hinder a third-party from reverse engineering the first API), or randomly generated (e.g., by having a code generation application automatically produce a WSDL-compliant first API definition 130).

A user has also used UI 120, as depicted in FIG. 4, to specify types for the input elements 210a, 21c-e in the second API definition 140. In particular, the user 150 has specified that input element 210a be of type "URI" in the second API definition 140. Similarly, the user 150 has specified that input element 210c be of type "BODY," and that input elements 210d,e be of type "QUERY." According to embodiments, each type corresponds to a positioning within a command syntax of the second API definition 140, as will be described in greater detail below.

The inclusion control of control sets 300*a*, 300*c-e*, are checked, whereas the inclusion control of control set 300*b* is unchecked. According to the embodiment of the UI 120 depicted in FIG. 4, this designates that input elements 210*a*, 210*c-e* be included in the second API definition 140, and that input element 210*b* not be included in the second API definition 140. In this particular example UI 120, because input element 210*b* is designated to not be included in the second API definition 140, the text control 310 and type control 320 for control set 300*b* are greyed out, as depicted by hatch marks in FIG. 4.

The UI control sets 300*a-e* are hierarchically organized under a text label "PostAccountTransactions" corresponding to the operation 220 that makes use of the respective input elements 210*a-e* according to the first API definition 130. A command control 410 for receiving a command for the input elements 210*a-e* in the second API definition 140 is also comprised within the UI 120. In the example UI 120, the user 150 has designated that the command for the input elements 210*a-e* in the second API definition 140 will be a "POST" command. The command control 410 may be implemented, according to embodiments, by a pull-down menu as depicted in FIG. 4. When implemented by a pull-down menu, the options in the pull-down menu may correspond to valid commands that may be specified in the second API definition 140. For example, if the second API definition 140 will use HTTP/1.1 messaging, then the command control 410 may provide the user 150 with the option to designate a "GET," "POST," "HEAD," "OPTIONS," "PUT," "DELETE," "TRACE," and "CONNECT." Alternatively, the command control 410 may be implemented by a textbox that allows the user 150 to type in a command.

According to embodiments, the user device 110 may determine an initial command for the control command 410 based on the operation 220 in the first API definition 130. Many APIs have common functions (e.g., adding, deleting, reading, and writing to an object), the nature of which are readily identifiable from the operation 220, due to coding conventions that are commonly practiced by those in the art. For example, it is common for an API to have "getter" and "setter" functions for objects in the API which are prefixed with the term "get" and "set" keystrings, respectively. Thus, according to embodiments of the present disclosure, a "get" operation 220 in the first API definition 130 may be determined to be a relevant read operation 220 in the second API definition 140, and a "set" operation 220 in the first API definition 130 may be determined to be a relevant write operation 220 in the second API definition 140. With regard to the example illustrated by the UI 120 of FIG. 4, the operation 220 is a "PostAccountTransactions" operation. According to embodiments, the user device 110, when parsing the first API definition 130, may be programmed to detect the prefix "Post" and assign an initial command of "POST" to the command control 410. In this way, the user device 110 may provide an initial configuration of the UI 120 to the user 150 that attempts to reduce the amount of effort the user 150 will need to expend to configure the UI 120 for generating the second API definition 140.

According to embodiments, the user device 110 limits the type control 320 of a UI control set 300 based on the command received via the corresponding command control 410. For example, there may be certain operations 220 for which certain types are not appropriate. With reference to the example illustrated by the UI 120 depicted in FIG. 4, it may not be appropriate for an input element 210 to be in the body of an HTTP message (according to the intended design of the second API) when the user 150 has set the command in the command control 410 to be a GET operation. Accordingly, the UI 120 may limit the type controls 320 of the corresponding UI control sets 300*a-e* to prevent the user 150 from selecting the "BODY" type when the command control 410 has a GET command selected. If a type control 320 of a corresponding UI control set 300 is already set to be of type "BODY," then the UI may clear the inclusion control to prevent that input element 210 from being included in the second API definition 140, or may change the type specified in the UI control set 300 to a selection that is valid in the second API.

Figure 5:
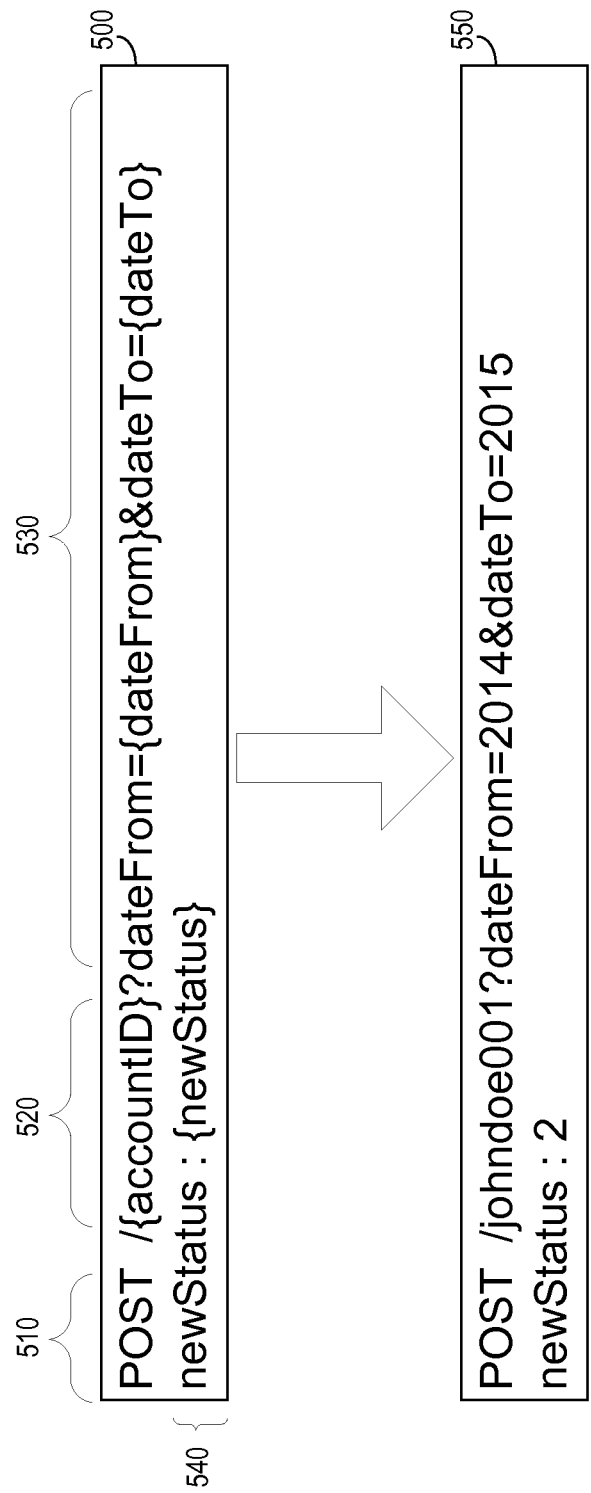
FIG. 5 is a logical diagram illustrating an example command syntax of a second API definition, and an example message according to a second API that uses the command syntax, according to embodiments of the present disclosure.

The second API definition 140 is generated based on the configuration of the UI 120. In particular, generating the second API definition 140 comprises positioning a name received by a UI control set 300 within a command syntax of the second API definition 140. FIG. 5 illustrates an example command syntax 500 of the second API definition 140, and an example message 550 according to the second API that makes use of the command syntax 500. For purposes of illustration, the command syntax 500 is consistent with HTTP messaging. Other embodiments may make use of other command syntaxes that are consistent with other forms of messaging.

According to embodiments, generating the second API definition 140 includes positioning input provided by the user 150 via the UI 120 within the command syntax 500. The example command syntax 500 depicted in FIG. 5 has four valid positions where input from the user 150 to be positioned: a command part 510, a hierarchical part 520, a query part 530, and a request body 540. The command part 510 corresponds to the part of an HTTP message where the HTTP method is specified. When generating the second API definition 140, the user device 110 may position the HTTP POST command received in the example UI 120 of FIG. 4 via the command control 410 at the command part 510 of the command syntax 500. Thus, according to embodiments, generating the second API definition 140 includes positioning the command received from the user 150 via the command control 410 within the command syntax 500.

The hierarchical part 520 corresponds to the hierarchical part of a Uniform Resource Identifier (URI) of an HTTP message (i.e., the part of a URI where a path would be specified). When generating the second API definition 140, the user device 110 may position the name "accountID" received via the text control 310 of UI control set 300*a* in accordance with the type received via the type control 320 of that same UI control set 300*a*. As shown in FIG. 4, the user 150 has configured UI control set 300*a* to associate the name "accountID" with type "URI." Thus, the user device 110 may, according to embodiments, position the name "accountID" in the hierarchical part 520 of the command syntax 500, as opposed to the command part 510, the query part 530 or the request body 540. Similarly, the user device 110 may position the name "newStatus" received via the text control 310 of UI control set 300*c* in the request body 540, and position the names "dateFrom" and "dateTo" in the query part 530, in accordance with the type received via the respective type controls 320 of the respective UI control sets 300*c-e*. Thus, according to embodiments, generating the second API definition 140 includes positioning the name, received by the text control 310 of a UI control set 300, within the command syntax 500 of the second API definition 140 according to the type received by the type control 320 of the UI control set 300. Note that because the inclusion control 330 of UI control set 300*b* is not checked, generating the second API definition 140 may exclude the name provided in the text control 310 of UI control set 300b (if any) from the second API definition 140.

Generating the second API definition 140 may also include generating certain fixed portions of the command syntax 500 that do not depend on the input of the user 150. For example, the command syntax 500 depicted in FIG. 5 shows that the command part 510 is separated from the hierarchical part 520 by a space and a forward slash regardless of any value provided by the user 150. Similarly, hierarchical part 520 is separated from the query part 530 by a question mark. Further, the query part 530 is separated from the request body 540 by a new line. Other fixed portions within the command syntax 500, as appropriate for the messaging used by the second API definition 140, may be generated according to embodiments.

According to embodiments, multiple UI control sets 300 may be configured with the same type. For example, control sets 300d,e are both configured with the "QUERY" type. Thus, according to embodiments, generating the second API definition 140 may include inserting separation characters between names that correspond to the same type. In the example of FIG. 5, the "dateFrom" and "dateTo" names are separated by an ampersand, as is appropriate for query strings at the end of the URI section of an HTTP message.

Further, generating the second API definition 140 may include adding other information to connote how the name is used in the command syntax 500. For example, according to the example command syntax 500 of FIG. 5, names of type "URI" are surrounded by curly brackets, to indicate that the value of the corresponding input element is used for a corresponding HTTP message 550, rather than the literal characters of the name provided by the user 150. Thus, the name "accountID," being curly bracketed in command syntax 500, would result in the value of the "accountID" parameter (i.e., "johndoe001") being used for an actual HTTP message 550 that adheres to the second API definition 140. Similarly, names of type "QUERY" are followed by an equals sign, and a curly-bracketed instance of the name. Thus, the name "dateFrom" would result in the actual literal string "dateFrom" appearing in actual HTTP message 550, followed by an equals sign, followed by the value of the "dateFrom" parameter (i.e., 2014) being used for an actual HTTP message 550 that adheres to the second API definition 140. Thus, according to embodiments, each type that is selectable by a type control 320 or command control 410 in the UI 120 may correspond to a rule for generating a corresponding portion of the command syntax 500 of the second API definition 140.

Figure 6:
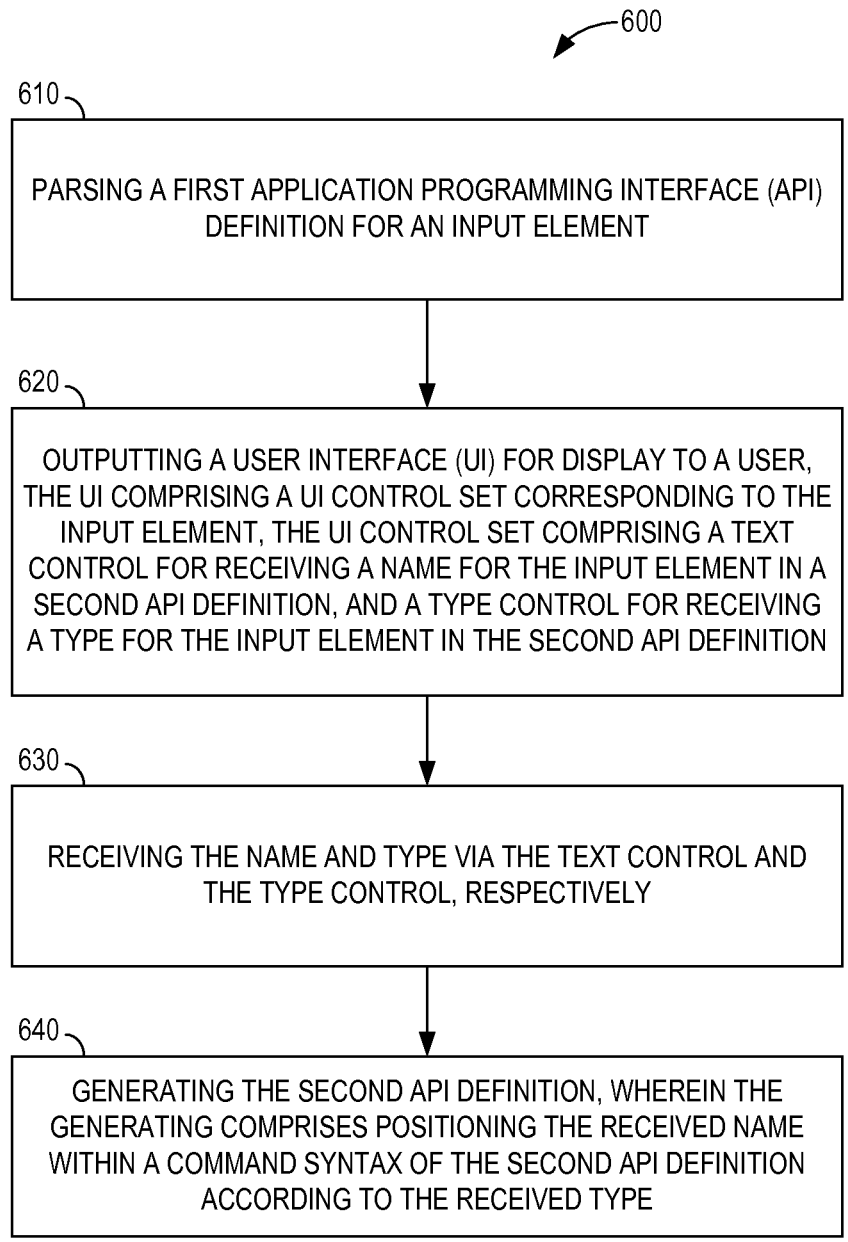
FIG. 6 is a flow diagram illustrating a method for generating a second API definition from a first API definition and user input, according to embodiments of the present disclosure.

FIG. 6 illustrates an example method 600 according to embodiments of the present disclosure. The method 600 comprises parsing a first API definition 130 for an input element 210 (block 610), and outputting a user interface (UI) 120 for display to a user 150. The UI 120 comprises a UI control set 300 corresponding to the input element 210. The UI control set 300 comprises a text control 310 for receiving a name for the input element 210 in a second API definition 140, and a type control 320 for receiving a type for the input element 210 in the second API definition 140 (block 620). The method 600 further comprises receiving the name and type via the text control 310 and the type control 320, respectively (block 630), and generating the second API definition 140 (block 640). The generating comprises positioning the received name within a command syntax 500 of the second API definition 140 according to the received type.

Figure 7:
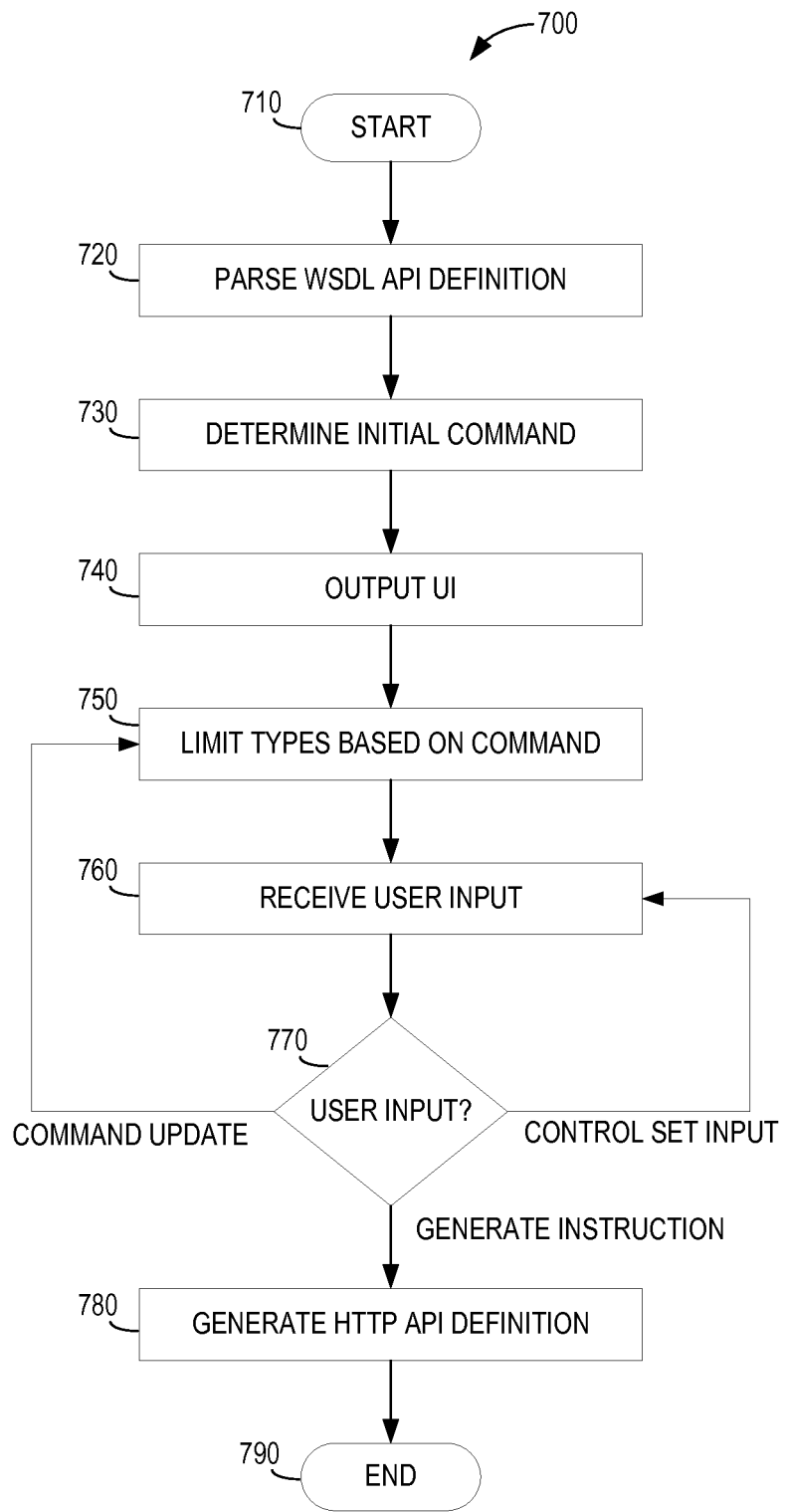
FIG. 7 is a flow diagram illustrating a more detailed method for generating a second API definition from a first API definition and user input, according to embodiments of the present disclosure.

FIG. 7 illustrates a more detailed method 700 according to embodiments of the present disclosure. To begin the method 700 (block 710), a user device 110 parses a WSDL API definition (i.e., an example of a first API definition 130) for input elements 210 and an operation 220 that makes use of the input elements 210 (block 720). The user device 110 then determines an initial command from the operation 220 parsed from the WSDL document (block 730). The user device 110 then outputs a UI 120 for display to a user 150 that comprises a UI control set 300 for each input element 210 parsed from the WSDL document (block 740). The UI control sets 300 are hierarchically organized under a text label that corresponds to the operation 220 parsed from the WSDL document. Each UI control set 300 comprises a text control 310, a type control 320, and an inclusion control 330. The text control 310 is for receiving a name of the input element 210, corresponding to the UI control set 300, in an HTTP API definition (i.e., an example of a second API definition 140). The type control 320 is for receiving a type of the input element 210, corresponding to the UI control set 300, in the HTTP API definition. The inclusion control 330 is for designating whether the input element 210 is included in the HTTP API definition. Each control set 300 is visually associated within the UI 120 with a corresponding identifier of the respective input element 210 according to the WSDL API definition. The UI 210 also comprises a command control 410 that reflects the initial command that was determined from the operation 220.

The method 700 further comprises the user device 110 limiting the types that the user 150 may select within the control sets 300 based on the command in the command control 410 (block 750). The user device 110 then receives user input via the UI 120 (block 760). The user device 110 may take different actions depending on the user input that is received (block 770).

If the user device 110 receives a command update via the command control 410, the user device 110 will update how the types of the UI command sets 300 are limited (block 750) and respond again according to further user input that is subsequently received (blocks 760, 770). If the user device 110 receives input to a UI control set 300 (e.g., a text control 310 receives a name; a type control 320 receives a type; an inclusion control 330 designates inclusion/exclusion), the user device 110 will await further input and respond accordingly (blocks 760, 770). If the user device 110 receives user input that constitutes an instruction to generate the HTTP API definition, the user device 110 will proceed to do so (block 780). In particular, the user device 110 will position the names, received via each control set 300, within a respective command syntax 500 of the HTTP API definition according to the corresponding types input by the user 150. After all control sets 300 designated for inclusion in the HTTP API definition have been included in the generation process, the method 700 will end (block 790). Aspects of the method 700 may be implemented according to any or all of the teachings discussed above.

Figure 8:
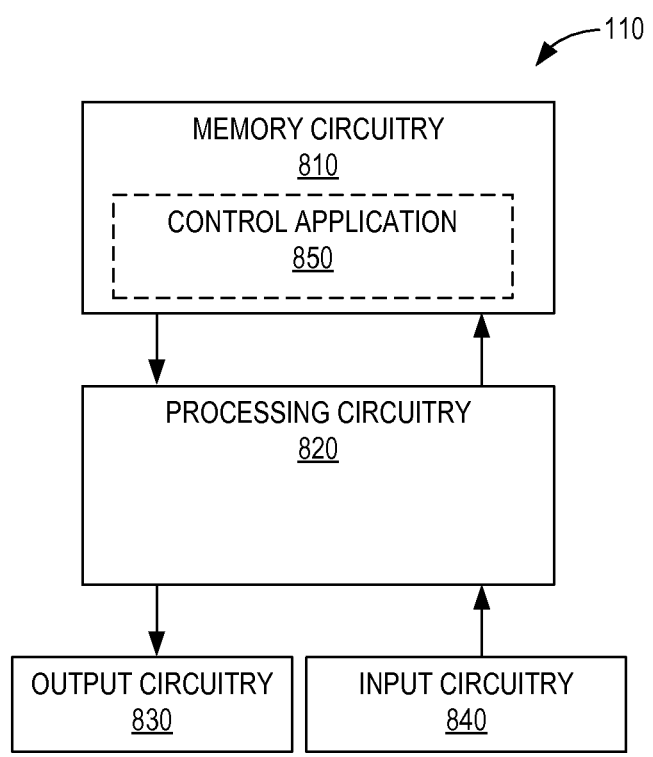
FIG. 8 is a block diagram illustrating the physical circuitry of an example user device configured to generate a second API definition from a first API definition and user input, according to embodiments of the present disclosure.

FIG. 8 illustrates example hardware of the user device 110 according to embodiments. The user device 110 comprises processing circuitry 820 that is communicatively coupled to memory circuitry 810, output circuitry 830, and input circuitry 840, e.g., via one or more buses. The processing circuitry 820 may comprise any sequential state machine capable of executing machine instructions stored as a machine-readable computer program 850 in the memory circuitry 810, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. The memory circuitry 810 of the various embodiments may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The output circuitry 830 is configured to output signals for display to the user 150. For example, the output circuitry 830 may be comprised within one or more of a graphics adapter, a graphical processing unit, a display port, a Liquid Crystal display, a Light Emitting Diode display, and a transmitter. When the output circuitry 830 is comprised within a transmitter, the output circuitry 830 communicates with a remote receiver (not illustrated in FIG. 8) so that the signals may be displayed to the user at a remote location. The input circuitry 840 is configured to accept input from a user 150 of the user device 110. For example, the input circuitry 840 may be comprised within one or more of a pointing device (such as a mouse, stylus, touchpad, trackball, pointing stick, joystick), a touchscreen, a microphone for speech input, an optical sensor for optical recognition of gestures, a keyboard, and a receiver. When the input circuitry 840 is comprised within a receiver, the input circuitry 840 communicates with a remote transmitter (not illustrated in FIG. 8) so that the user may provide input to the user device 110 from a remote location. The processing circuitry 820 is configured to parse a first API definition 130 for an input element 210, and output a UI 120, via the output circuitry 830, for display to a user 150. The UI 120 comprises a UI control set 300 corresponding to the input element 210. The UI control set 300 comprises a text control 310 for receiving a name for the input element 210 in a second API definition 140, and a type control 320 for receiving a type for the input element 210 in the second API definition 140. The processing circuitry 820 is further configured to receive, via the input circuitry 840, control signals specifying the name and type via the text control 310 and type control 320, respectively, and to generate the second API definition 140. The generating comprises positioning the received name within a command syntax 500 of the second API definition 140 according to the received type.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A method comprising:
   parsing, by a computer system, a first application programming interface (API) definition for an input element;
   determining, by the computer system based on the first API definition, an initial command to be used in a second API definition;
   outputting, by the computer system, a user interface (UI) for display to a user, the UI comprising a UI control set corresponding to the input element, the UI control set comprising:
   a text control for receiving a name for the input element in the second API definition; and
   a type control for receiving a type for the input element in the second API definition, wherein available types for the input element are limited by the computer system based on the determined initial command;
   receiving, by the computer system, the name and type via the text control and the type control, respectively; and
   generating, by the computer system, the second API definition, wherein the generating comprises positioning the received name within a command syntax of the second API definition according to the received type.

2. The method of claim 1, further comprising:
   parsing, by the computer system, the first API definition for an operation that makes use of the input element according to the first API definition;
   wherein outputting the UI comprises hierarchically organizing the UI control set under a text label corresponding to the operation.

3. The method of claim 2, further comprising:
   receiving, by the computer system, a command for the input element in the second API definition via a command control of the UI, wherein the command corresponds to the operation that makes use of the input element according to the first API definition and replaces the initial command;
wherein generating the second API definition further comprises positioning the command within the command syntax.

4. The method of claim 2, wherein the initial command is determined based on a label of the operation that makes use of the input element.

5. The method of claim 1, wherein generating the second API definition further comprises positioning the initial command within the command syntax.

6. The method of claim 1:
wherein the UI control set further comprises an inclusion control for designating whether the input element is included in the second API definition;
wherein positioning the received name within the command syntax of the second API definition according to the received type is in response to the inclusion control designating that the input element is included in the second API definition.

7. The method of claim 1:
wherein generating the second API definition comprises generating the second API definition according to Hypertext Transfer Protocol (HTTP);
wherein positioning the received name within the command syntax of the second API definition according to the received type comprises positioning, according to the received type, the received name in one of:
a hierarchical part of an HTTP Uniform Resource Identifier (URI);
a query part of the HTTP URI; and
a request body corresponding to the HTTP URI.

8. The method of claim 1, wherein parsing the first API definition comprises parsing a Web Services Description Language (WSDL) document.

9. The method of claim 1, wherein outputting the UI further comprises outputting a visual association between:
an identifier of the input element according to the first API definition; and
the UI control set.

10. The method of claim 1, wherein the initial command is determined without receiving user input that defines the initial command.

11. A user device comprising:
input circuitry configured to accept input from a user of the user device;
output circuitry configured to output signals for display to the user;
processing circuitry, communicatively coupled to the input circuitry and the output circuitry, the processing circuitry configured to:
parse a first Application Programming Interface (API) definition for an input element;
determine, based on the first API definition, an initial command to be used in a second API definition;
output a user interface (UI), via the output circuitry, for display to a user, the UI comprising a UI control set corresponding to the input element, the UI control set comprising:
a text control for receiving a name for the input element in the second API definition; and
a type control for receiving a type for the input element in the second API definition, wherein available types for the input element are limited based on the determined initial command;
receive, via the input circuitry, control signals specifying the name and type via the text control and type control, respectively; and
generate the second API definition, wherein the generating comprises positioning the received name within a command syntax of the second API definition according to the received type.

12. The user device of claim 11:
wherein the processing circuitry is further configured to parse the first API definition for an operation that makes use of the input element according to the first API definition;
wherein to output the UI the processing circuitry is configured to hierarchically organize, via the output circuitry, the UI control set under a text label corresponding to the operation.

13. The user device of claim 12:
wherein the processing circuitry is further configured to receive, comprised within the control signals, a command for the input element in the second API definition specified via a command control of the UI, wherein the command corresponds to the operation that makes use of the input element according to the first API definition and replaces the initial command;
wherein to generate the second API definition, the processing circuitry is further configured to position the command within the command syntax.

14. The user device of claim 11, wherein to generate the second API definition, the processing circuitry is configured to position the initial command within the command syntax.

15. The user device of claim 11:
wherein the UI control set further comprises an inclusion control for designating whether the input element is included in the second API definition;
wherein the processing circuitry is configured to position the received name with the command syntax of the second API definition according to the received type in response to the inclusion control designating that the input element is included in the second API definition.

16. The user device of claim 11:
wherein to generate the second API definition, the processing circuitry is configured to generate the second API definition according to Hypertext Transfer Protocol (HTTP);
wherein to position the received name within the command syntax of the second API definition according to the received type, the processing circuitry is configured to position, according to the received type, the received name in one of:
a hierarchical part of an HTTP Uniform Resource Identifier (URI);
a query part of the HTTP URI; and
a request body corresponding to the HTTP URI.

17. The user device of claim 11, wherein to parse the first API definition, the processing circuits are configured to parse a Web Services Description Language (WSDL) document.

18. The user device of claim 11, wherein to output the UI, the processing circuitry is further configured to output a visual association, via the output circuitry, between:
a name of an input element according to the first API definition; and
the corresponding UI control set.

19. A non-transitory computer readable storage medium having program instructions stored thereon that are capable of causing a computer system to perform operations comprising:

parsing a first application programming interface (API) definition for an input element;
determining, based on the first API definition, an initial command to be used in a second API definition;
outputting a user interface (UI) for display to a user, the UI comprising a UI control set corresponding to the input element, the UI control set comprising:
  a text control for receiving a name for the input element in the second API definition; and
  a type control for receiving a type for the input element in the second API definition, wherein available types for the input element are limited by the computer system based on the determined initial command;
receiving the name and type via the text control and the type control, respectively; and
generating the second API definition, wherein the generating comprises positioning the received name within a command syntax of the second API definition according to the received type.

* * * * *